(12) United States Patent
Bellows

(10) Patent No.: US 6,872,308 B1
(45) Date of Patent: Mar. 29, 2005

(54) CONDENSATE POLISHER WITH DEEP CATION BED AND POWDERED RESIN BED

(75) Inventor: James C. Bellows, Maitland, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/734,821

(22) Filed: Dec. 13, 2003

(51) Int. Cl.[7] .............................. C02F 1/42; C02F 9/00
(52) U.S. Cl. ...................................... 210/284; 210/290
(58) Field of Search ................................ 210/685, 686, 210/284, 290

(56) References Cited

U.S. PATENT DOCUMENTS

| | | | | |
|---|---|---|---|---|
| 3,537,989 A | * | 11/1970 | Crits | 210/673 |
| 3,849,306 A | * | 11/1974 | Anderson | 210/685 |
| 3,870,033 A | * | 3/1975 | Faylor et al. | 392/470 |
| 3,985,648 A | * | 10/1976 | Casolo | 210/669 |

* cited by examiner

Primary Examiner—Ivars C. Cintins

(57) ABSTRACT

The present invention provides for a condensate polisher system that comprises a feed water flow that enters one or more deep bed condensate polishers. These deep bed condensate polishers contain ion resin beads that exchange a single ion type, typically cation resin for power generation systems. The feed water passing through the deep bed condensate polishers has a substantial portion, and even all of the cations in solution removed. This produces a semi-purified water flow that is then fed into one or more powdered resin polishers. The powdered resin polishers, which contain mixed powdered ion exchange resins or single type powdered resins depending on the nature of the semi-purified water flow, then finish the purification process on the water, producing a purified water flow.

20 Claims, 2 Drawing Sheets

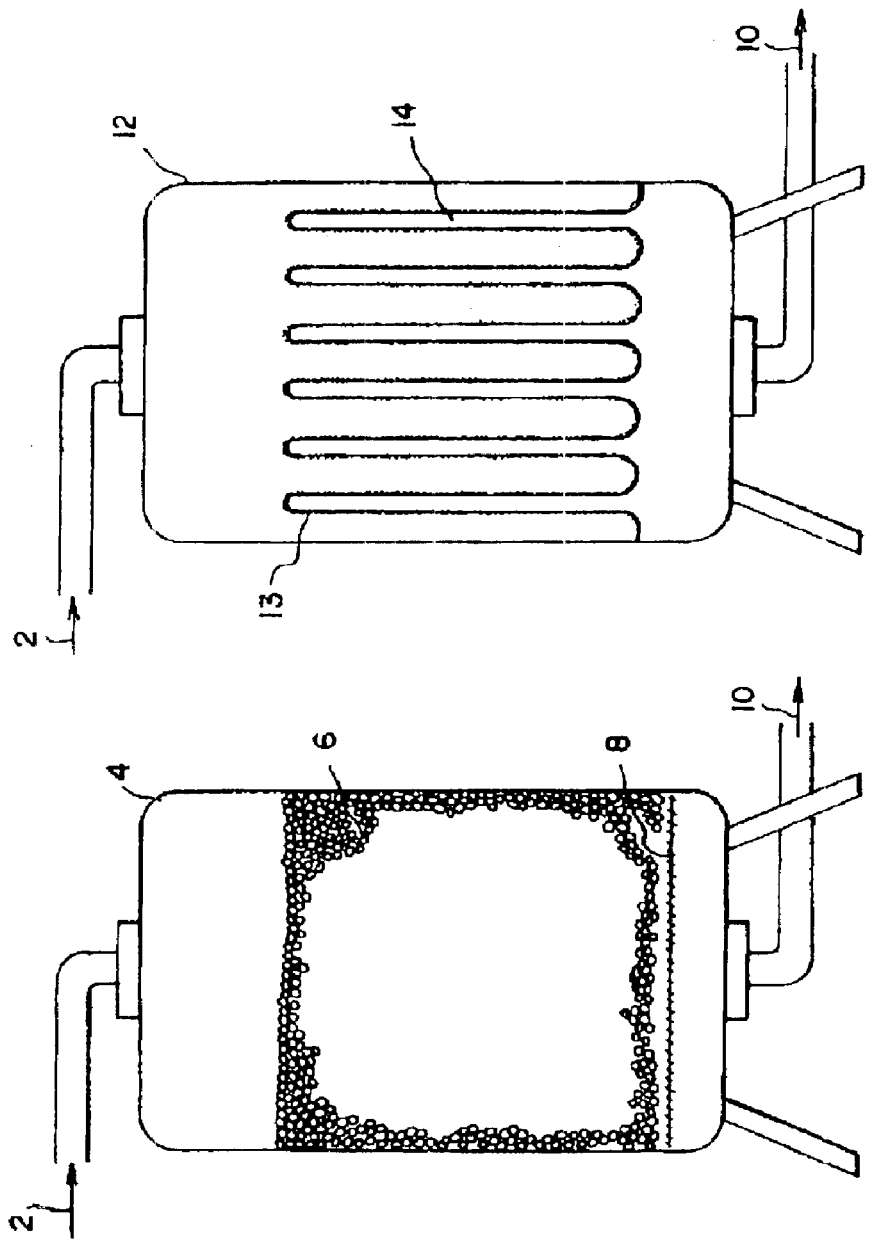

CONDENSATE POLISHER WITH DEEP CATION BED AND POWDERED RESIN BED

BACKGROUND

Condensate polishers are used to purify water in a large variety of systems. Condensate polishers are used chiefly in power plants or other plants condensing steam. Typical condensate polishers are designed for high flow and are composed of mixtures of cation and anion resins. As water flows over the ion exchange resin, charged particles (ions) in the water are drawn out and bonded to it. Two standard types of condensate polishers are deep bed polishers and powdered resin polishers.

Deep bed polishers comprise resin beads, approximately 500–1000 micro meters in diameter, contained in a column through which feed water is passed. The ratio of cation to anions beads may be varied depending on the expected concentration of ions in the water. In practice, many are heavy in cation bead concentration due to the large amount of cations, such as ammonia, that are added to the feed water in pre-filtering steps. An advantage of deep bed polishers is that they have large capacity and are relatively inexpensive to keep up. Unfortunately, when the beads have reached operational capacity in adsorbing ions, the process for regenerating the beads is onerous. This is primarily due to the difficulty in separating the anion from the cation beads. When the beads are being regenerated, they first need to be separated and separation needs to be substantially complete. A single anion bead, for example, can contaminate a large number of cation beads if it is not properly separated during the regenerating process. Deep bed polishers last for days or weeks depending on the nature of the feed water.

FIG. 1 shows an example of a deep bed polisher. Feed water 2 enters a deep bed polisher 4 and passes over a large amount of ion beads 6. A screen 8 prevents the beads from exiting the polisher with the filtered water 10.

Techniques for separating the ion exchange beads are varied and include suspending the beads in a neutral buoyancy solution so that the minute density difference between the cation and anion beads will allow the two to separate. Despite the ingenuity in the various techniques for separating the beads, the process is still problematic and time consuming.

The second type of common condensate polisher is the powdered resin system. In this technique the resin is reduced to powdered resin particles, of approximately 25 micrometers in size. The powdered resin is coated on a mesh large enough to allow water flow but fine enough to prevent passage of the powdered resin. Similar to the deep bed polishers, the concentration of anion powdered resin to cation powdered resin may be adjusted depending on expected need. Due to the powdered nature of the resin, these types of polishers are also good at filtering suspended impurities, such as iron oxide and sand. However, they are less effective at capturing ions than the deep bed polishers. Also, when the powdered resin reaches ion absorption capacity, the resin cannot be effectively regenerated and is disposed of and replaced.

FIG. 2 illustrates an example of a powdered resin polisher. Feed water 2 enters the powdered resin polisher 12 and passes over the powdered resin 13 that is mounted on a mesh 14. The filtered water then is drawn from the polisher 10. Powdered resin polishers typically last for hours or days depending on the nature of the feed water.

What is needed is a condensate polisher that is easy to regenerate, has excellent ion exchange efficiency and filters suspended particles.

SUMMARY OF THE INVENTION

The present invention provides for a condensate polisher system that comprises a feed water flow that enters one or more deep bed condensate polishers. These deep bed condensate polishers contain ion, resin beads that exchange a single ion type, typically cation resin for power, generation systems. The feed water passing through the deep bed condensate polishers has a substantial portion, and even all of the cations in solution removed. This produces a semi-purified water flow that is then fed, into one or more powdered resin polishers. The powdered resin polishers, which contain mixed powdered ion exchange resins or single type powdered resins depending on the nature of the semi-purified water flow, then finish the purification process on the water, producing a purified water flow.

In one embodiment the deep bed polisher comprises exclusively cation beads and the powdered resin polisher comprises mixed resin powder with an anion resin concentration substantially larger than the cation resin concentration.

In another embodiment the deep bed polisher comprises exclusively cation beads and the powdered resin polisher comprises exclusively anion resin powder.

In another embodiment there are a greater number of powdered resin polishers than deep bed polishers in the condensate polisher system, which may be used to balance the difference in flow rates between the two types of polishers.

BRIEF DESCRIPTION OF THE FIGURES

FIG. 1 illustrates an example of a deep bed polisher.

FIG. 2 illustrates an example of a powdered resin polisher.

DETAILED DESCRIPTION OF THE INVENTION

Figure 3:
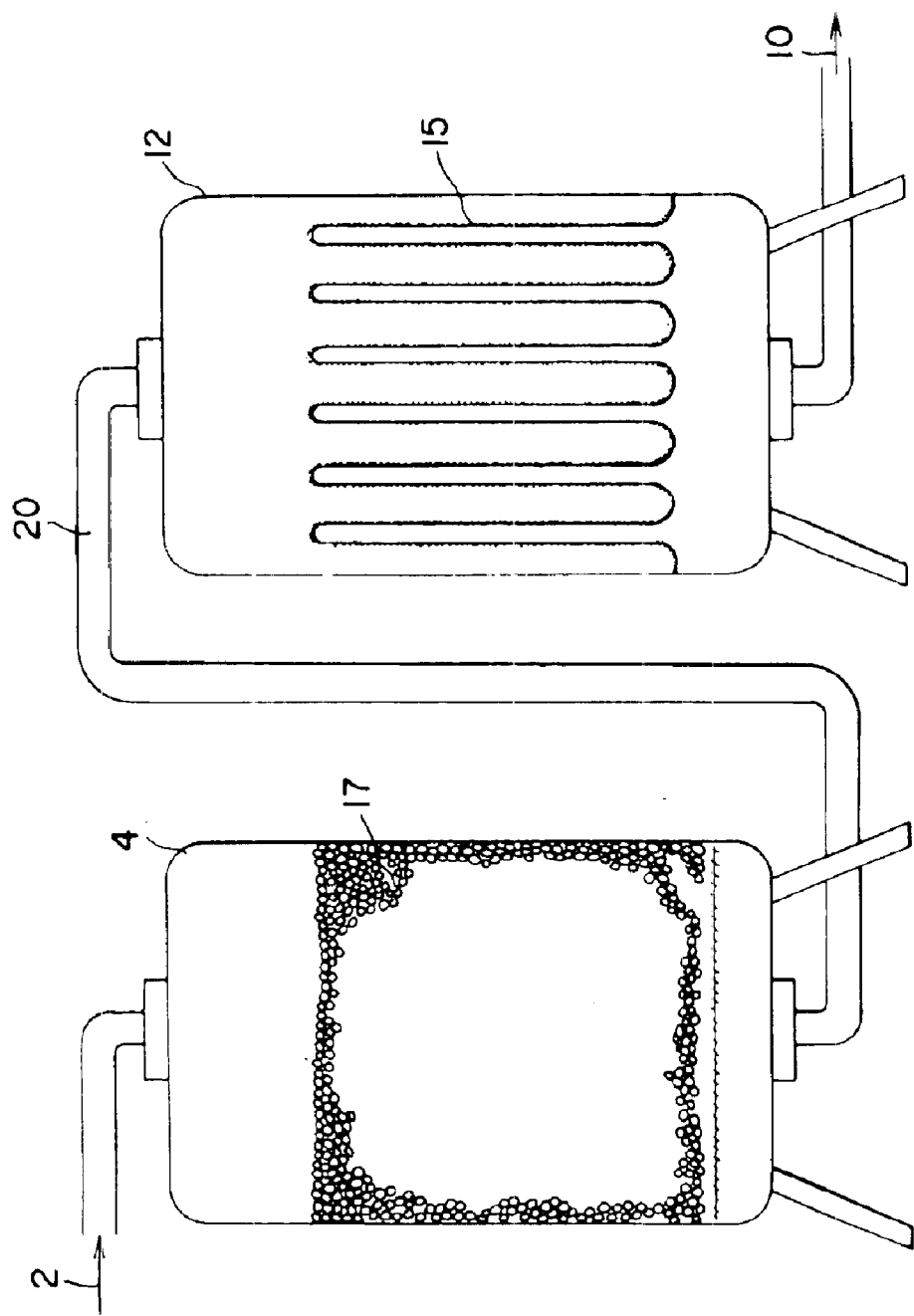
FIG. 3 illustrates an example of one embodiment of the present invention where a single ion type deep bed polisher is followed by a powdered resin polisher.

In one embodiment, the present invention provides for a; condensate polisher system that comprises a feed water flow that enters one or more deep bed condensate polishers. These deep bed condensate polishers contain ion exchange resin beads of a single type, typically cation resin in power generation systems. The feed water passing through the deep bed condensate polishers has a substantial portion, and possibly even all, of the cations in solution removed. This produces a semi-purified water flow that is then fed into one or more powdered resin polishers. The powdered resin polishers, which contain mixed ion powdered resins or single type powdered resins depending on the nature of the semi-purified water flow, then finish the purification process on the water, producing a purified water flow.

As used herein, the term cation resin type refers to resins that will attract cations in solution by exchanging them for bound cations, and anion resin type refers to resins that will attract anions in a similar manner. Single type resin and single ion type refer to either cation type or anion type. In both the types of polishers, the term exclusively single type resin allows for a small amount of cross type contamination, as long as the polisher as a whole still functions as desired. Single type resins and one type resins refer to resins with either a cation or anion type. Mixed resins contain both cation and anion type subcomponents.

Deep bed polishers are effective at removing ions from large volumes of water. However, mixed deep bed polishers present a problem when the resin beads become saturated and need to be regenerated. Cation beads need to be separated from anion beads before the two can be regenerated, and small amounts of cross contamination present large problems when regeneration takes place. As can be imagined, the greatest effort in regenerating a mixed bed is in first separating thousands of similarly sized beads and the quality of this separation must be near perfect.

In the present invention, only a single type of resin bead, either cation or anion, is used in the deep bed polisher. This makes regenerating, the deep bed polisher relatively easy since no bead separation is required. In addition, when forming the deep bed, there is no need to evenly mix two beads since only one type of bead is being used. Therefore assembly time of the deep bed polisher is also reduced. Purifying water using deep bed polishers is usually done on a large scale. The deep bed polisher shown in FIG. 1 can vary in size, but commercial embodiments are about 4 to 8 feet (1.2 to 2.4 m) high and 6 to 8 (1.8 m to 2.4 m) feet in diameter, handling flow rates of up to 1,500 gallons/min (6,800 liters/min). Deep bed polishers are known to handle greater flow rates than powdered resin polishers. Condensate polishers-may be readily purchased from suppliers such as Graver® or US Filter®.

The resins used in making the beads or powder, which are commonly made from the same types of resins, are known to those of ordinary skill in the art. Particular types include polystyrene and acrylics. These resins are used for either cation or anion resins. Polystyrene resins are made different by adding appropriate functional groups, such as sulfonate for cation resin and amine for anion resin. Acrylic resins use the intrinsic carboxylic acid group as a cation exchange site.

Although the ion concentration in feed water can vary greatly, most large scale condensate polisher systems use feed water that is heavy in cations. This is primarily due to the large quantities of ammonia that is added to the water prior to reaching the polishers. Ammonia is intentionally added to the water for pH control. This ammonia is added after the polishers, but circulates through the entire system and eventually reaches the polishers. Other chemicals may also be used as a pH control. Since the feed water in many applications is initially heavy in cation concentration, in one embodiment the resin beads of the deep bed polisher are cation type. The feed water may also be adjusted to appropriate pH to maximize the effectiveness of the, condensate resin, and most resins operate best at a pH close to 7. The first polisher in the system actually moves the pH of the feed water close to 7, thereby improving the effectiveness of any downstream polishers.

The condensate polisher system of the present invention always has one or more deep bed polishers with single type resin beads preceding the powdered resin polishers. FIG. 3 illustrates a basic example of feed water 2 flowing into a deep bed polisher 4 that comprises substantially exclusively single ion type beads 17. Though this example shows a single deep bed polisher, in other embodiments the water flow is passed through multiple deep bed polishers, in series or in parallel. In still another embodiment the semi-purified flow 20 is then directed to an additional apparatus before being diverted to a powdered resin polisher 12. In particular embodiments the deep bed polishers remove the ion in the feed water that is in the greatest concentration.

Depending on the size of the initial deep bed polisher, the nature of the feed water, and whether or not multiple deep bed polishers are used in succession, the powdered resin polisher may have single type or mixed resin powder 15. Essentially, if all or sufficient amounts of cations (or anions if anion type beads are being used) have been, removed by the deep bed polisher, then the powdered resin polisher may comprise exclusively single type resin powder. If this is the case then the resin powder will be opposite to the resin beads in the deep bed polisher.

If the deep resin bed(s) does not remove all of the non-desired single type ions, then the powdered resin polisher will comprise a mixed powdered resin. Since the deep bed polisher will have removed substantial portions of a certain type of single type of ion, the mixed bed polisher will preferably have ratios heavy in the opposite type resin. The ratio of the type of powder in one example of mixed ion powdered resin is from 1:1 to 1:10 by weight, and more particularly 1:3.

When the water flow leaves the deep bed polisher it is considered semi-purified since it will have substantial quantities of only one type of ion removed. The flow at this point can be diverted into a single powdered resin polisher, multiple powdered resin polishers in series, or it can be divided between multiple powdered resin polishers that can have similar or different types of powdered resins.

The types of ions removed from feed water can include most possible types of ions in existence. However, the most common varieties expected include ammonia, sodium, calcium, magnesium and potassium. Common varieties of anions include chloride, sulfate, nitrate and carbonate. The powdered resin polisher will also remove particulate matter such as iron oxides and sand.

In one embodiment the present invention provides for a condensate polisher system. In the system, a feed water flow enters one or more deep bed polishers. The deep bed polishers may be in series or in parallel. The polishers have resins beads that are substantially exclusively single ion type. The feed water passes through the deep bed polishers and a semi-purified water flow is produced that is significantly reduced in one type of ion. The semi-purified water then flows to one or more powdered resin polishers. The powdered resin polishers comprises either a mixed ion powder or a single type ion powder opposite to the resin beads in the deep bed polisher. The semi-purified water flow pass, through the one or more powdered resin polisher to produce a purified water flow that is essentially free of all undesired ions.

In one embodiment the resin beads in the deep bed polisher are cation type. In a related embodiment, the ratio of cation to anion powder in the mixed ion powdered resin is from 1:1 to 1:10 by weight, and more particularly 1:3.

In one embodiment the feed water flow is adjusted to, approximately pH.

In another embodiment the number of powdered resin polishers in the condensate polisher system is greater than the number of deep bed polishers.

In still another embodiment the semi-purified flow is directed to different powdered resin polishers depending on the nature of the semi purified water flow. For example, if the semi-purified flow is relatively high in cations, it can be directed to a mixed resin powdered polisher that is relatively high in cation powdered resin.

In another embodiment the resin beads and powdered resin comprise polystyrene, acrylics or mixtures thereof. In a particular embodiment the polystyrene comprises the cation exchange functional group of sulfonate and the anion exchange functional group of amine.

In a particular embodiment the resins beads are from about 500–1000 micrometers in diameter.

In another particular embodiment the resin powder comprises particulates approximately 25 micrometers in size.

In another embodiment of the present invention at least one of the deep bed polishers has a two phase system, comprising a single type of resin bead in each of the phases of the system. The two phases are stacked one on top of the other in a deep bed polisher and separated by a water permeable barrier.

In another embodiment at least two deep bed polisher are used in series, each comprising a single type of charged ion bead, though the two deep bed polishers have beads of opposite type from the other. In a related embodiment, at least two powdered resin polishers are used in series, each comprising a single type of charged resin powder, though the two powdered resin polishers have resin of opposite from the other.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A condensate polisher system consisting of:
   a feed water flow;
   at least one deep bed polisher, wherein said deep bed polisher comprises resin beads that are substantially exclusively single ion type, wherein said feed water enters said at least one deep bed polisher to produce a semi-purified water flow;
   at least one powdered resin polisher, wherein said powdered resin polisher comprises a mixed ion powdered resin;
   wherein said at least one powdered resin polisher accepts said semi-purified water flow from said at least one deep bed polisher to produce a purified water flow;
   wherein when said mixed ion powdered resin reaches ion absorption capacity said mixed ion powdered resin is disposed of and replaced.

2. The system of claim 1, wherein said resins beads are cation type.

3. The system of claim 1, wherein the ratio of cation to anion powder in said mixed ion powdered resin is from 1:1 to 1:10 by weight.

4. The system of claim 3, wherein the ratio of cation to anion powder in said mixed ion powdered resin is 1:3.

5. The system of claim 1, wherein said feed water flow is adjusted to approximately pH 7.

6. The system of claim 1, wherein the number of powdered resin polishers in said condensate polisher system is greater than the number of deep bed polishers.

7. The system of claim 6, wherein said semi-purified water flow is directed to different powdered resin polishers depending on the nature of the semi-purified water flow.

8. The system of claim 1, wherein said resins beads and said powdered resin comprises polystyrene.

9. The system of claim 1, wherein said resin powder comprises particulates approximately 25 micrometers in size.

10. The system of claim 1, wherein said resin beads are from about 500–1000 micrometers in diameter.

11. A condensate polisher system consisting of:
    a feed water flow;
    at least one deep bed polisher, wherein said deep bed polisher comprises resin beads that are substantially exclusively single ion type, wherein said feed water enters said at least one deep bed polisher to produce semi-purified water;
    at least one powdered resin polisher, wherein said powdered resin polisher comprises powdered resin is substantially exclusively single ion type opposite to said resin beads;
    wherein said at least one powdered resin polisher accepts said semi-purified water flow from said at least one deep bed polisher to produce a purified water flow;
    wherein when said powdered resin reaches ion absorption capacity said powdered resin is disposed of and replaced.

12. The system of claim 11, wherein said resins beads are cation type.

13. The system of claim 11, wherein the number of powdered resin polishers in said condensate polisher system is greater than the number of deep bed polishers.

14. The system of claim 11, wherein said resins beads and said powdered resin comprises polystyrene.

15. A condensate polisher system consisting of:
    a feed water flow;
    at least one deep bed polisher, wherein said deep bed polisher comprises charged resin beads that are substantially exclusively cation type, wherein said feed water enters said at least one deep bed polisher to produce a semi-purified water flow;
    at least one powdered resin polisher, wherein said powdered resin polisher comprises a mixed ion powdered resin;
    wherein said at least powdered resin polisher accepts said semi-purified water flow from said at least one deep bed polisher to produce a purified water flow;
    wherein when said mixed ion powdered resin reaches ion absorption capacity said mixed ion powdered resin is disposed of and replaced.

16. The system of claim 15, wherein the ratio of cation to anion powder in said mixed ion powdered resin is from 1:1 to 1:10 by weight.

17. The system of claim 16, wherein the ratio of cation to anion powder in said mixed ion powdered resin is 1:3.

18. The system of claim 15, wherein the number of powdered resin polishers in said condensate polisher system is greater than the number of deep bed polishers.

19. The system of claim 15, wherein said resins beads and said powder resin comprises polystyrene.

20. The system of claim 19, wherein said polystyrene comprises the cation exchange group of sulfonate and the anion exchange functional group of amine.

* * * * *